(12) United States Patent
Nakano et al.

(10) Patent No.: US 7,403,306 B2
(45) Date of Patent: Jul. 22, 2008

(54) IMAGE READING WITH HIGH FIT ACCURACY

(75) Inventors: Kazuhiro Nakano, Nagano (JP); Toshimitsu Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 612 days.

(21) Appl. No.: 10/977,991

(22) Filed: Oct. 29, 2004

(65) Prior Publication Data

US 2006/0092481 A1  May 4, 2006

(51) Int. Cl.
- H04N 1/04 (2006.01)
- H04N 1/46 (2006.01)
- G06K 9/00 (2006.01)
- B65H 5/00 (2006.01)

(52) U.S. Cl. .................. 358/1.9; 358/474; 358/486; 358/488; 358/505; 382/140; 271/8.1; 271/10.12

(58) Field of Classification Search ................ 358/1.9, 358/494, 497, 471, 474, 486, 488, 482–483, 358/512–514, 505; 382/312, 318–319, 140; 399/211–212; 250/239; 235/454; 271/8.1, 271/10.12

See application file for complete search history.

(56) References Cited

U.S. PATENT DOCUMENTS 5,875,376 A * 2/1999 Chou ..................... 399/211
6,888,651 B2 * 5/2005 Lee ........................ 358/497
7,158,270 B2 * 1/2007 Sheng et al. ............ 358/497

FOREIGN PATENT DOCUMENTS

JP  07-307843  11/1995

* cited by examiner

*Primary Examiner*—David Moore
*Assistant Examiner*—Charlotte M. Baker
(74) *Attorney, Agent, or Firm*—John J. Penny, Jr.; Edwards Angell Palmer & Dodge LLP

(57) ABSTRACT

An image reading apparatus includes a guide rod; a housing member having a guide part for abutting a document placed on a document table and positioning one side of the document on a table face of the document table and a first positioning part and a second positioning part projecting to the back side of the document table, when both end parts of the guide rod abut against the first positioning part and the second positioning part, the first positioning part and the second positioning part for positioning the guide rod at a position where the one side of the document positioned by the guide part and the longitudinal direction axis are parallel; a fix unit for pressing the guide rod against the first positioning part and the second positioning part; a carriage being fitted slidably into the guide rod; and a carriage drive section for moving the carriage along the guide rod.

3 Claims, 8 Drawing Sheets

IMAGE READING WITH HIGH FIT ACCURACY

BACKGROUND OF THE INVENTION

This invention relates to an image reading apparatus and in particular to a flat-bed image reading apparatus.

Hitherto, an image reading apparatus such as a flat-bed image scanner has been known. In the flat-bed image reading apparatus, a carriage on which an optical system is mounted is moved in parallel to the table face of a document table, whereby the main scanning line is moved in its vertical direction (subscanning direction) for reading a document.

If the fit accuracy of a guide section for positioning a document within a predetermined read area on the table face of the document table and a guide rod for guiding the carriage in the subscanning direction is low, the margin of the document cannot be read or an area where no document exists appears in the margin of the read image.

However, in the flat-bed image reading apparatus in the related art, generally the guide section for positioning a document on the table face of the document table is placed in an upper housing member and the guide rod is positioned to a lower housing member and the upper housing member and the lower housing member engage with each other, whereby the guide rod is positioned relative to the guide section. If the positioning part of the guide rod and the guide section are thus largely away from each other on the structure and are placed in the separate members, it is difficult to improve the fit accuracy of the guide section and the guide rod.

SUMMARY OF THE INVENTION

It is therefore an object of the invention to provide an image reading apparatus with high fit accuracy of a guide section of a document and a guide rod.

To the end, according to the invention, there is provided an image reading apparatus including a transparent document table for placing a document thereon; a guide rod; a housing member having a guide part for abutting the document placed on the document table and positioning one side of the document on a table face of the document table and a first positioning part and a second positioning part projecting to the back side of the document table, when both end parts of the guide rod abut against the first positioning part and the second positioning part, the first positioning part and the second positioning part for positioning the guide rod at a position where the one side of the document positioned by the guide part and the longitudinal direction axis are parallel; a fix unit for pressing the guide rod against the first positioning part and the second positioning part; an image pickup section for generating image data representing an optical image on a light reception face; a carriage being fitted slidably into the guide rod; an optical system at lease whose part is mounted on the carriage for forming an image of the document placed on the document table, the image on a main scanning line parallel with a perpendicular of the longitudinal direction axis of the guide rod on the light reception face of the image pickup section; and a carriage drive section for moving the carriage along the guide rod. The positioning parts of the guide rod are provided in the housing member on the same document table side as the guide part rather than the housing member away from the document table, so that the fit accuracy of the guide section and the guide rod can be improved.

Further, the image reading apparatus according to the invention is characterized by the fact that the guide part, the first positioning part, and the second positioning part are formed in one piece. The guide part and the positioning parts of the guide rod are formed in one piece, whereby the fit accuracy of the guide section and the guide rod can be furthermore improved.

Further, the image reading apparatus according to the invention is characterized by the fact that the first positioning part and the second positioning part have a recess part shaped like a letter U formed in the housing member, the recess part into which the guide rod is fitted. The guide rod is pressed against the recess part shaped like a letter U formed in the positioning part, whereby it is made possible to precisely position the guide rod to the positioning part.

Further, the image reading apparatus according to the invention is characterized by the fact that the fix unit is formed integrally with a second housing member where the carriage drive section is fixed. The guide rod is pressed against the positioning part in the second housing member where the carriage drive section is fixed and the guide rod is fixed to the positioning part, so that the structure can be simplified and fitting can be facilitated.

DESCRIPTION OF THE PREFERRED EMBODIMENTS

Figure 1:
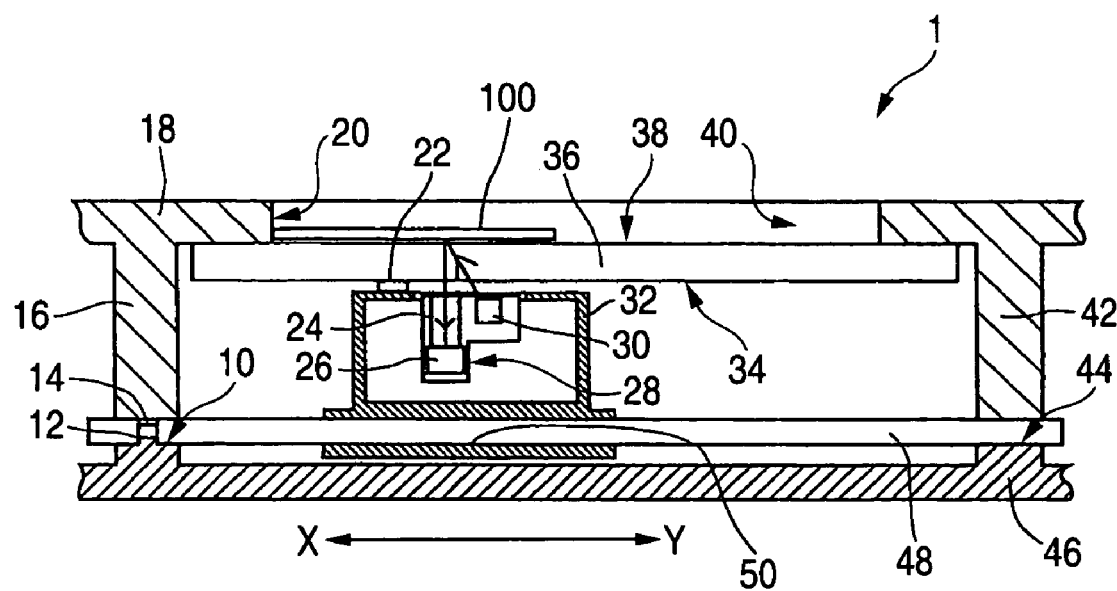
FIG. 1 is a schematic drawing to show the internal structure of an image scanner of one embodiment of the invention.
Figure 2:
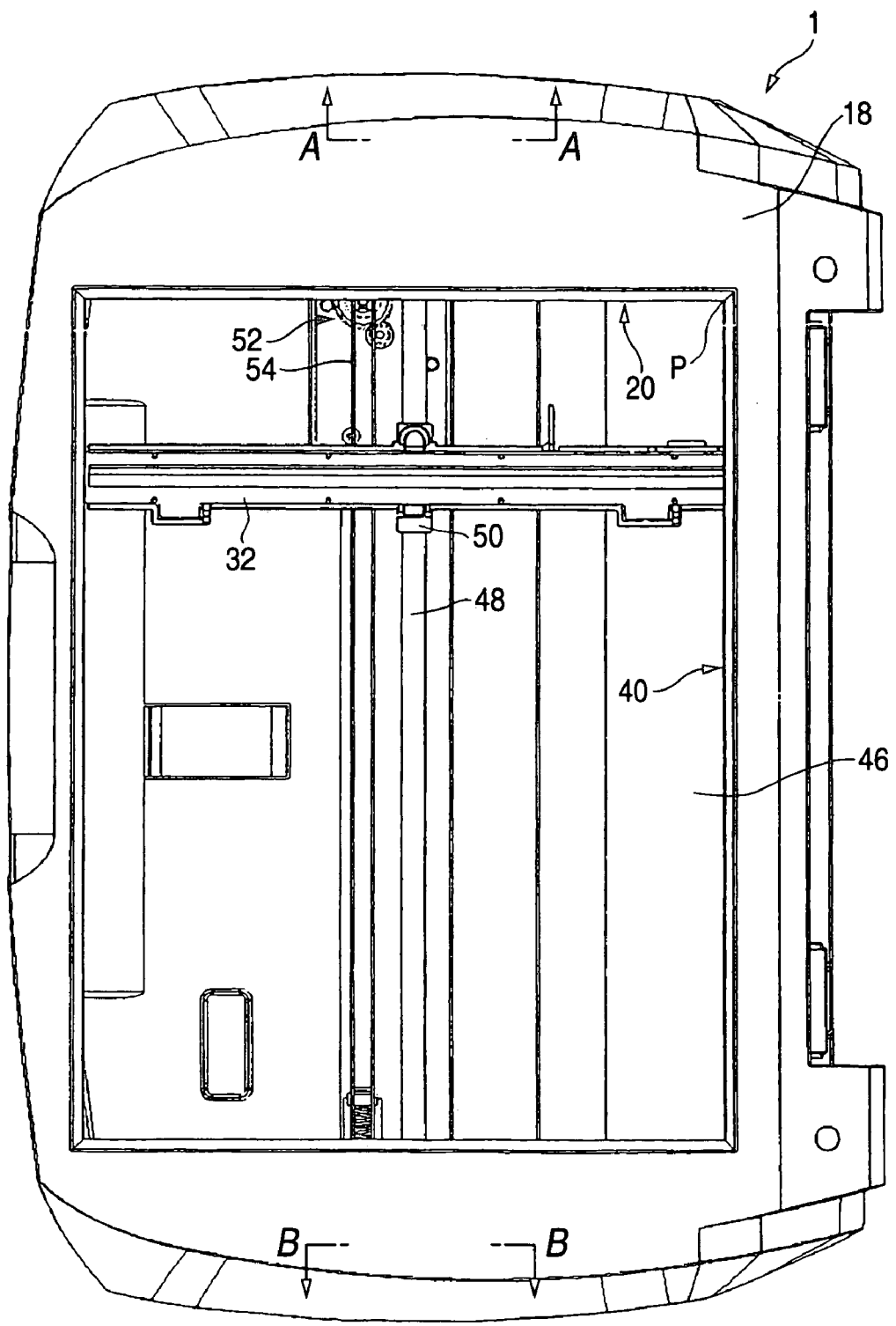
FIG. 2 is a plan view to show the image scanner of the embodiment of the invention.

Referring now to the accompanying drawings, there is shown a preferred embodiment of the invention. FIG. 1 is a schematic drawing to show the internal structure of an image scanner 1 of one embodiment of the invention. FIG. 2 is a plan view to show the image scanner 1 of the embodiment of the invention. It shows a state in which a document table 36 is removed.

The image scanner 1 is a flat-bed image reading apparatus for reading a document 100 placed on the document table 36. The document table 36 is formed of a transparent plate of glass, etc., and has a table face 38 on which the document 100 such as a print document, a photo, or a book is placed. The document table 36 is fixed to an upper housing 18 as a housing member with double-faced tape, etc.

A fit part 50 of a carriage 32 is fitted slidably into a guide rod 48 fixed to a first positioning part 16 and a second positioning part 42 of the upper housing 18. The guide rod 48 is a metal rod circular in cross section. The guide rod 48 is formed at one end part with an annular recess part 14. A contact type image sensor 28 is mounted on the carriage 32. A plurality of replaceable spacers 22 coming in sliding contact with a back 34 of the document table 36 are provided on the top face of the carriage 32 for making it possible to finely adjusting the attitude of the carriage 32 so that the contact type image sensor 28 is placed in a position parallel with the table face 38 of the document table 36. The carriage 32 is pulled by a belt 54 placed on a pulley driven by a motor (not shown) and reciprocates in the arrow X, Y direction in parallel with the table face 38 of the document table 36. When the carriage 32 moves in the arrow X, Y direction parallel with the table face 38 of the document table 36, the main scanning line to read the document 100 moves in its perpendicular direction (subscanning direction).

The contact type image sensor 28 includes an illumination section 30, a rod lens array 24, and a linear image sensor 26. The illumination section 30 as an optical system includes a light source of an LED, etc., a reflecting plate, and a light guide member for illuminating the proximity of the main scanning line. The rod lens array 24 as an optical system is made up of a large number of cylindrical lenses arranged linearly for forming an image of a document on the main scanning line on the light reception face of the linear image sensor 26 at equal magnification. The linear image sensor 26 as an image pickup section includes a large number of cells made of photoelectric conversion elements arranged linearly and a MOS transistor switch. The linear image sensor 26 accumulates a charge provided by executing photoelectric conversion of light in a predetermined wave range, such as visible light, infrared light, or ultraviolet light in each cell for a given time and converts the charge accumulated in each cell into an electric signal using the MOS transistor switch, thereby outputting an electric signal corresponding to light and shade of the optical image on the main scanning line. The analog signal output from the image sensor 28 is amplified and is converted into a digital signal by an A/D converter (not shown) and the digital signal is output from the A/D converter.

Figure 3:
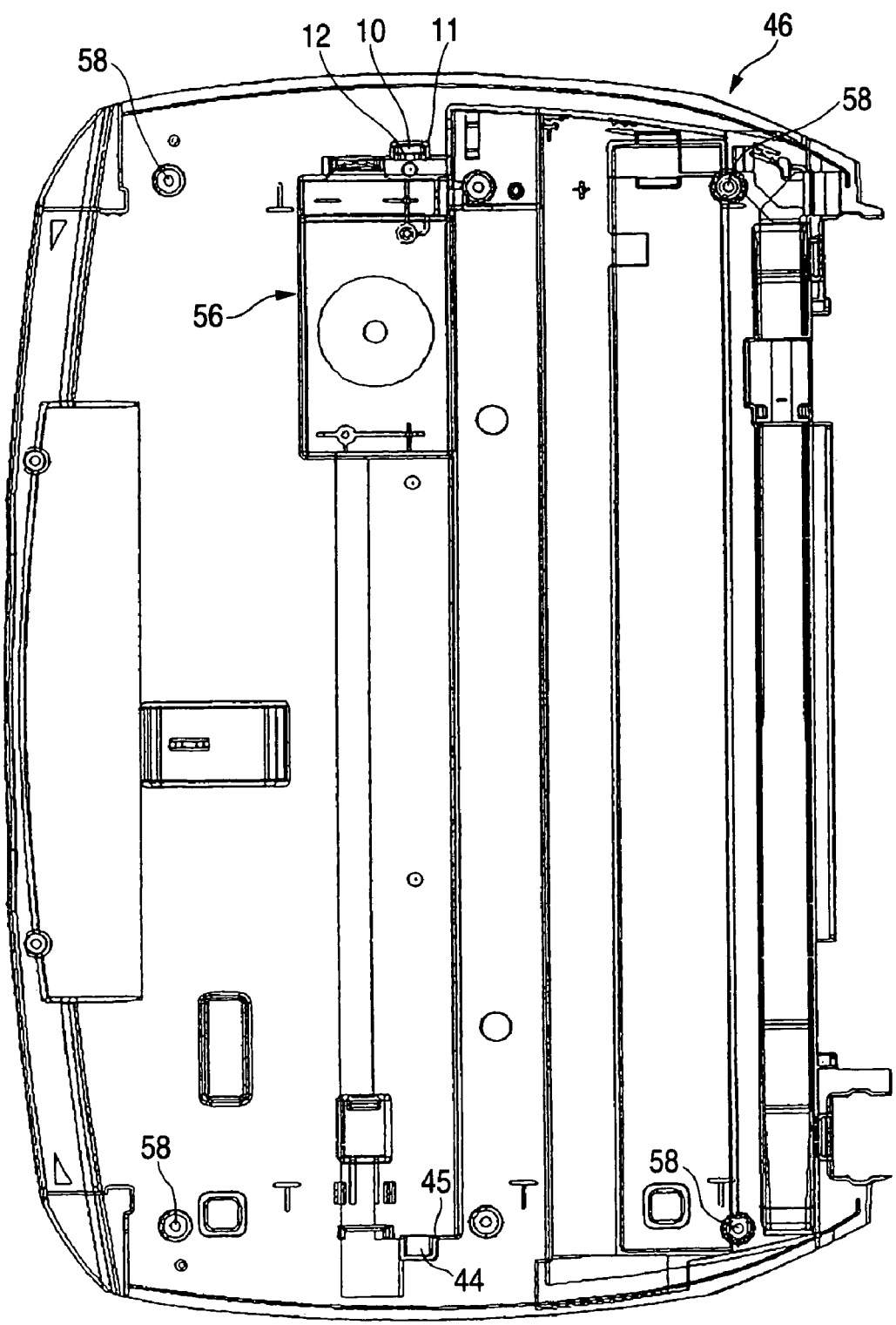
FIG. 3 is a plan view to show a lower housing according to the embodiment of the invention.

FIG. 3 is a plan view to show a lower housing 46 as a second housing member. A carriage drive section 52 made up of the belt 54 and a gear train and a motor for rotating the belt 54 (see FIG. 2) is fixed to an area 56 of the lower housing 46. The lower housing 46 is formed with a plurality of bosses 58 each formed with a screw hole for fastening the upper housing 18 and the lower housing 46 with a screw. A first rib 11 and a second rib 45 are formed like a letter U integral with the lower housing 46 at positions away from each other in the longitudinal direction of the lower housing 46.

A rib 12 shaped like a letter I extending in the width direction of the lower housing 46 is formed in the proximity of the first rib 11. When the guide rod 48 is fitted, both ends of the guide rod 48 are fitted into the insides of the first rib 11 and the second rib 45 and the annular recess part 14 formed at one end part of the guide rod 48 (see FIG. 1) and the rib 12 are fitted into each other, whereby the guide rod 48 can be positioned in the center axial direction thereof. The position of the guide rod 48 in the center axial direction thereof does not directly relate to the read accuracy. The first rib 11 and the second rib 45 are set to dimensions such that the guide rod 48 is fitted loosely into the insides of the first rib 11 and the second rib 45. At the assembling time, the rough position of the guide rod 48 can be determined according to the first rib 11 and the second rib 45, so that the assembling is facilitated.

Figure 4:
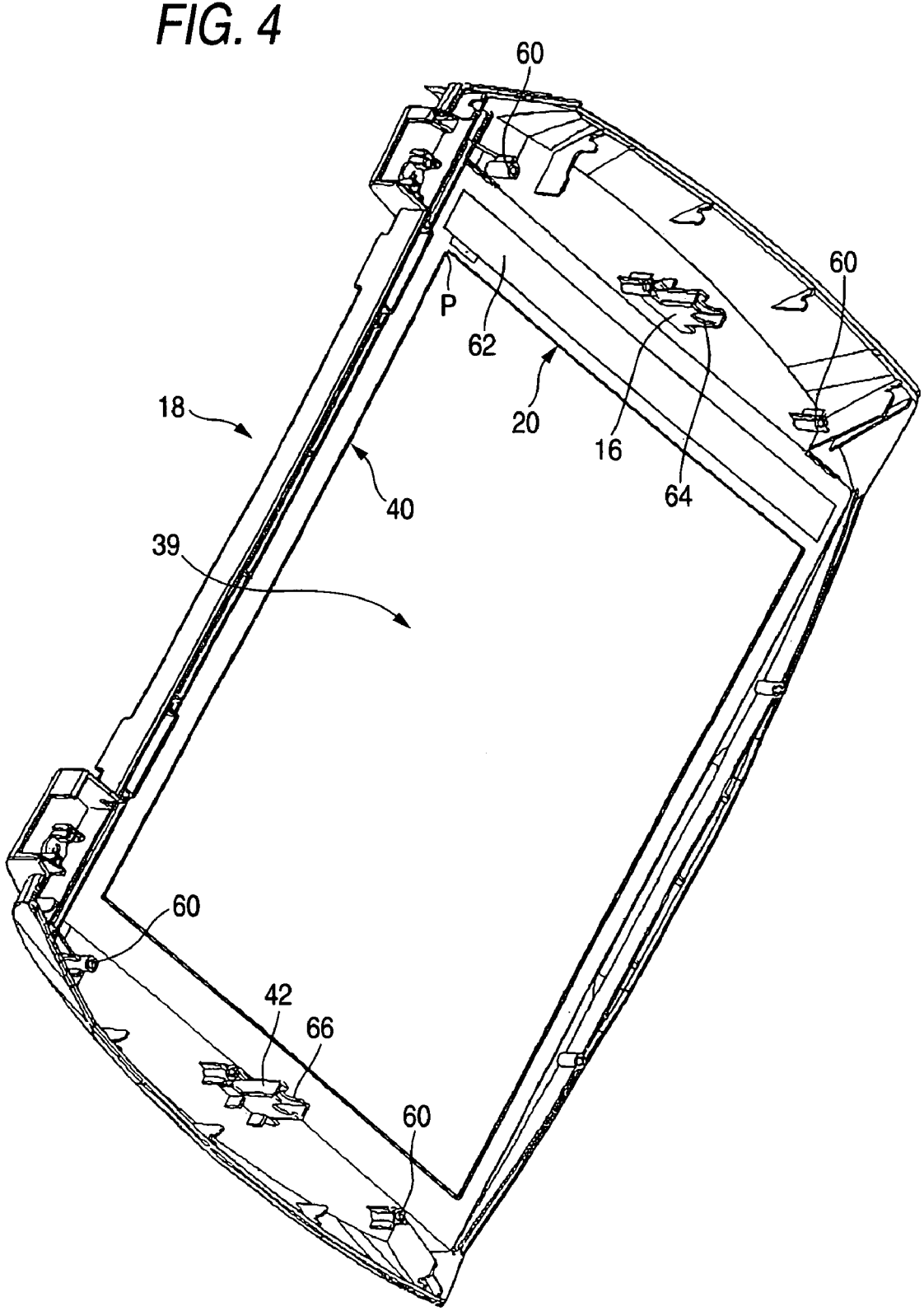
FIG. 4 is a perspective view to show the back of an upper housing according to the embodiment of the invention.

FIG. 4 is a perspective view to show the back of the upper housing 18.

The upper housing 18 is fastened to the lower housing 46 by screws screwed into the holes made in the plurality of bosses 60. The upper housing 18 is formed with a rectangular opening 39 closed by the document table 36. On the periphery of the opening 39, a subscanning direction guide face 40 and a main scanning direction guide face 20 as a document guide part are formed integrally with the upper housing 18. The subscanning direction guide face 40 and the main scanning direction guide face 20 may be formed, for example, as a member shaped like a letter L, a separate body from the upper housing 18. The subscanning direction guide face 40 and the main scanning direction guide face 20 are formed so that their longitudinal direction axes are orthogonal to each other. The subscanning direction guide face 40 and the main scanning direction guide face 20 are formed to position the two orthogonal sides of a rectangular document on the table face of the document table 36 by abutting the two orthogonal sides of the rectangular document against the guide faces. The document may be abutted against either the subscanning direction guide face 40 or the main scanning direction guide face 20 for positioning the document on the table face of the document table 36. In this case, a mark to position the document in the parallel direction to the guide face may be indicated and the user may align the mark and the end part of the document. The read origin is set at the same position as a point P at which the subscanning direction guide face 40 and the main scanning direction guide face 20 cross each other or at a position slightly inner away from the point P. In the proximity of the opening 39, a white reference plate 62 longer than the width of the opening 39 is provided in parallel with the main scanning direction guide face 20. The first positioning part 16 and the second positioning part 42 are formed integrally with the upper housing 18 on both sides with the opening 39 between.

Figure 5:
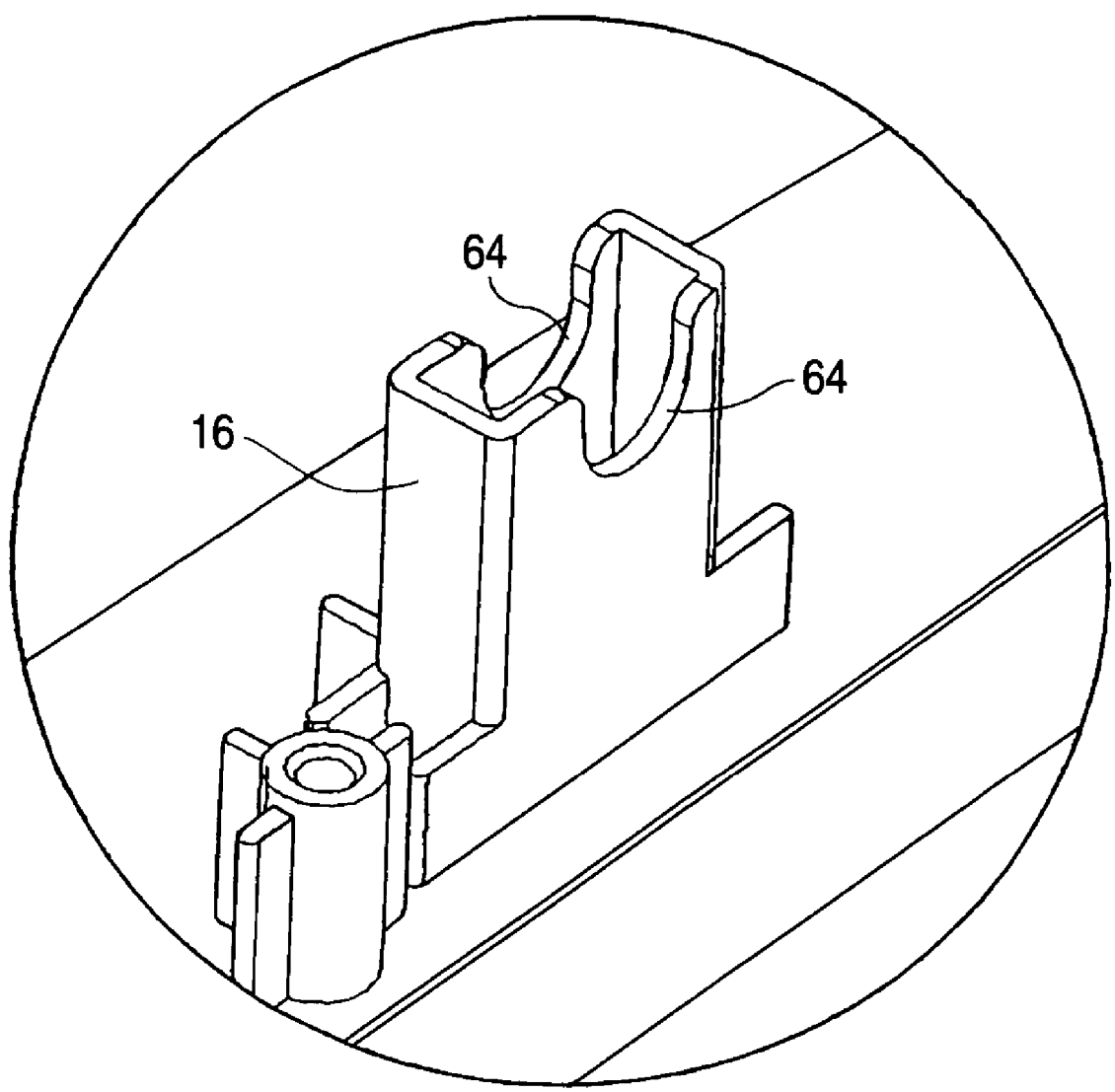
FIG. 5 is a perspective view to show a first positioning part according to the embodiment of the invention.
Figure 6:
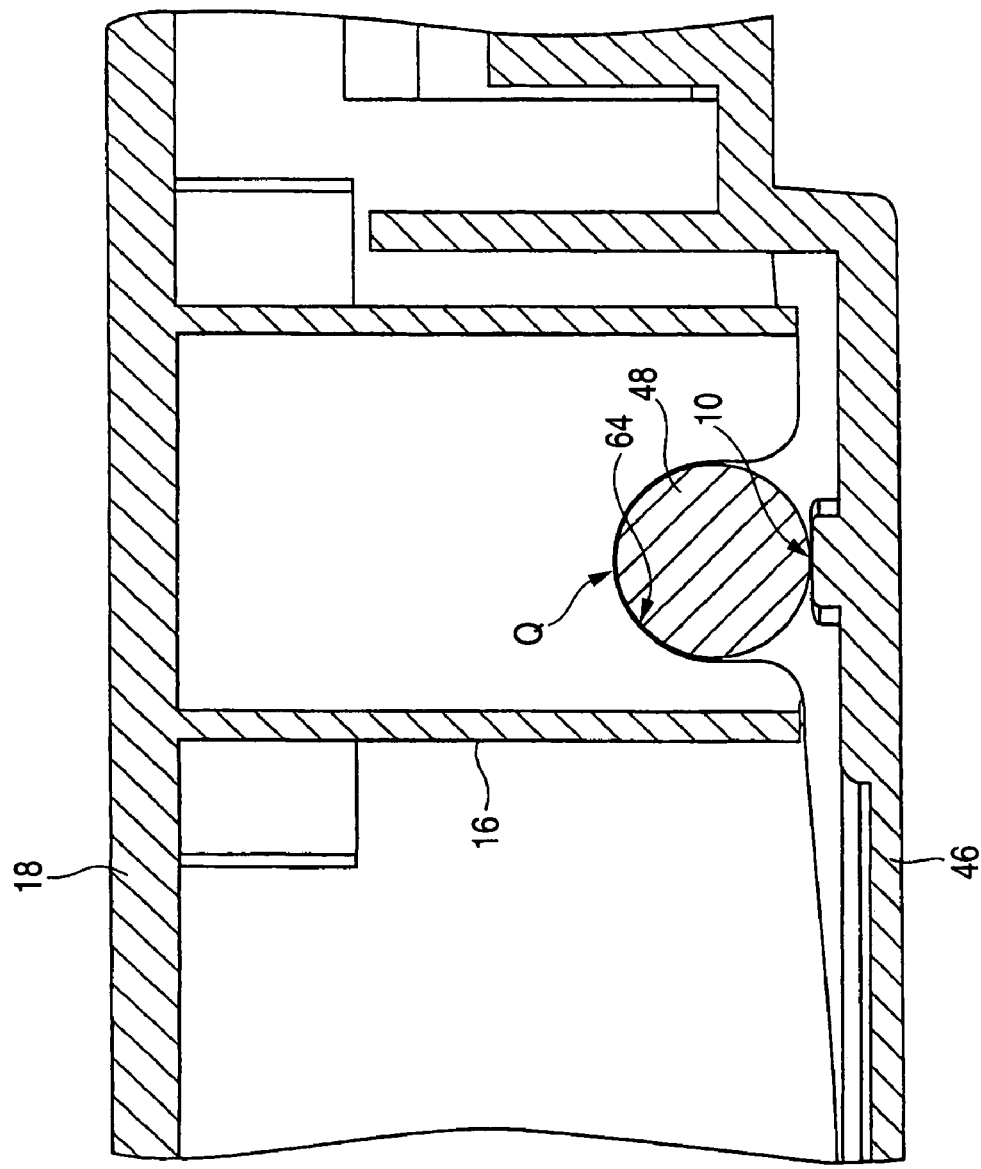
FIG. 6 is a sectional view taken on line A-A in FIG. 2.

FIG. 5 is a perspective view to show the first positioning part 16. FIG. 6 is a sectional view to show a state in which the guide rod 48 is fitted into the upper housing 18 and the lower housing 46.

The first positioning part 16 projects to the back side of the document table 36 in the perpendicular direction thereof from the back of the upper housing 18. The first positioning part 16 is formed with a recess part 64 dented like a letter U to the table face side of the document table 36 in the perpendicular direction thereof. The width of the recess part 64 in the proximity of the margin is wider than the diameter of the guide rod 48 and is narrower as a bottom Q is approached. When the lower housing 46 is put on the upper housing 18 in a state in which one end of the guide rod 48 is fitted loosely into the first rib 11 (see FIG. 3) of the lower housing 46 and the upper housing 18 and the lower housing 46 are fastened with screws, a part 10 surrounded by the first rib 11 of the lower housing 46 (corresponding to a fix unit) presses the guide rod 48 against the recess part 64 of the first positioning part 16. Consequently, the outer peripheral surface of the guide rod 48 is pressed against the bottom Q of the recess part 64 and the center axis of the guide rod 48 is positioned precisely.

Figure 7:
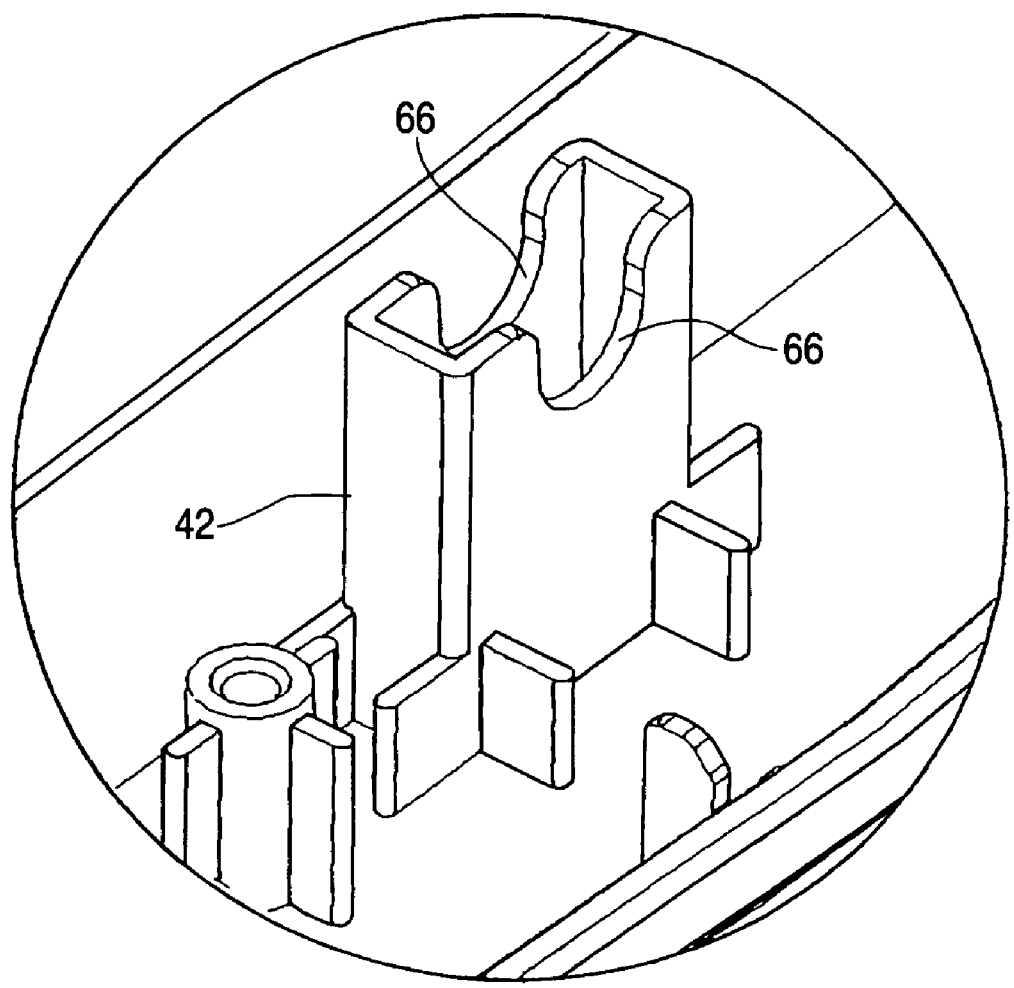
FIG. 7 is a perspective view to show a second positioning part according to the embodiment of the invention.
Figure 8:
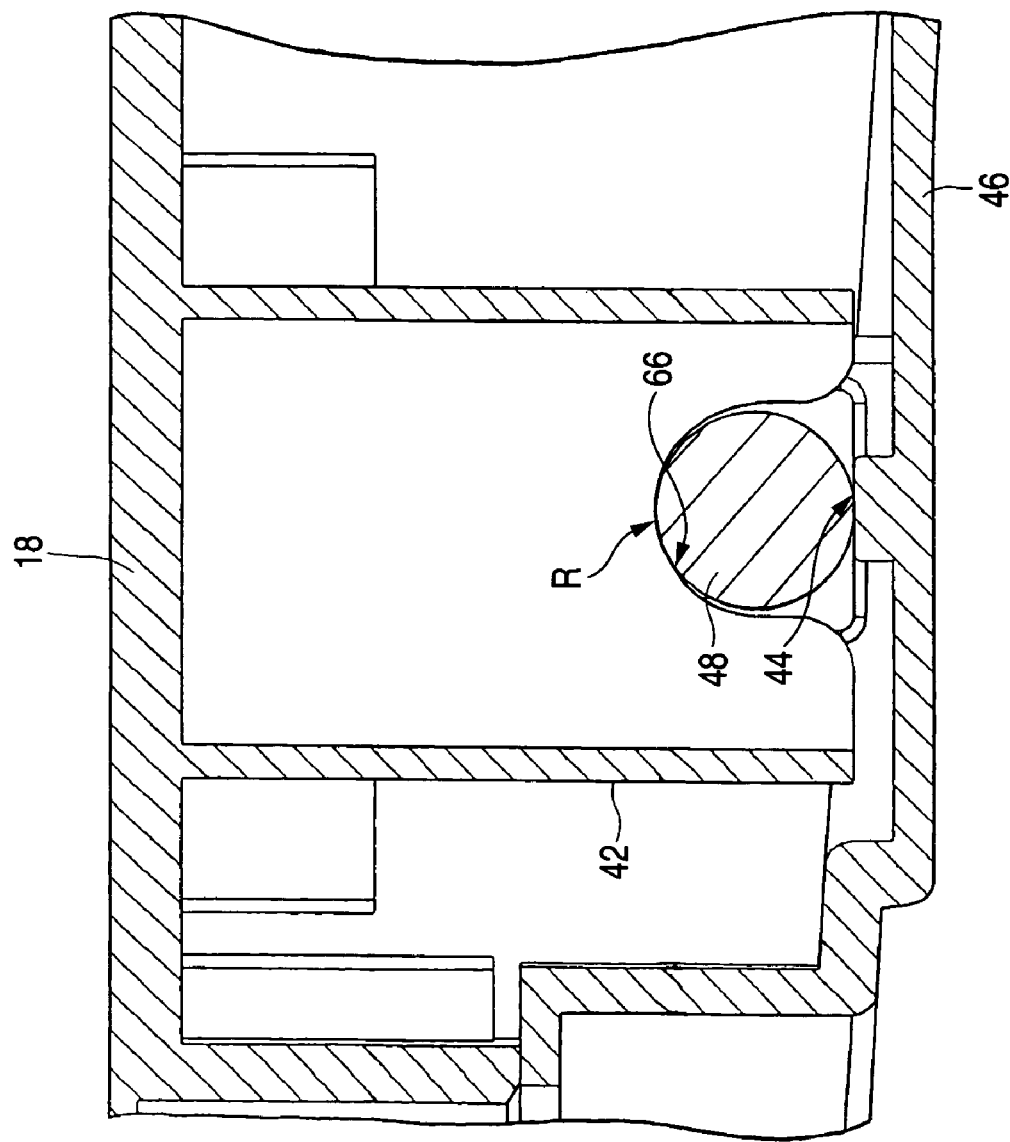
FIG. 8 is a sectional view taken on line B-B in FIG. 2.

FIG. 7 is a perspective view to show the second positioning part 42. FIG. 8 is a sectional view to show a state in which the guide rod 48 is fitted into the upper housing 18 and the lower housing 46. The second positioning part 42 projects to the back side of the document table 36 in the perpendicular direction thereof from the back of the upper housing 18.

The second positioning part 42 is formed with a recess part 66 dented like a letter U to the table face side of the document table 36 in the perpendicular direction thereof. The width of the recess part 66 in the proximity of the margin is wider than the diameter of the guide rod 48 and is narrower as a bottom R is approached. When the lower housing 46 is put on the upper housing 18 in a state in which an opposite end of the guide rod 48 is fitted loosely into the second rib 45 (see FIG. 3) of the lower housing 46 and the upper housing 18 and the lower housing 46 are fastened with screws, a part 44 surrounded by the second rib 45 of the lower housing 46 (corresponding to fix unit as claimed in WHAT IS CLAIMED IS) presses the guide rod 48 against the recess part 66 of the second positioning part 42. Consequently, the outer peripheral surface of the guide rod 48 is pressed against the bottom R of the recess part 66 and the center axis of the guide rod 48 is positioned precisely.

A phantom line connecting the bottom Q of the recess part 64 of the first positioning part 16 and the bottom R of the recess part 66 of the second positioning part 42 is parallel with the longitudinal direction axis of the subscanning direction guide face 40. The first positioning part 16 and the second positioning part 42 and the subscanning direction guide face 40 are formed in one piece, whereby the bottom Q of the recess part 64 and the bottom R of the recess part 66 can be positioned precisely relative to the subscanning direction guide face 40. Therefore, the guide rod 48 can be fitted with precise positioning at the position where the center axis becomes parallel with the subscanning direction guide face 40. Thus, the document can be placed precisely on the read area determined by the move section length of the carriage 32 and the width of the light reception face of the contact type image sensor 28. That is, the outer margin of the read area and the outer margin of a rectangular document can be made parallel and further the spacing between the outer margin of the read area and the outer margin of a rectangular document of a predetermined size can be set precisely. The guide rod 48 is positioned by the upper housing 18 where the document table 36 is directly fixed, whereby the distance between the table face 38 of the document table 36 and the contact type image sensor 28 can be set precisely. Since the guide rod 48 can be precisely positioned only using the upper housing 18 and the lower housing 46, the structure is simple and assembling is easy to perform.

In the embodiment, the guide rod 48 is positioned in the recess part shaped like a letter U, but the positioning part of the guide rod 48 may be of any shape if the shape allows the guide rod 48 to be positioned at least at the position where the center axis becomes vertical in the longitudinal direction of the subscanning direction guide face 40 or at the position where the center axis becomes vertical in the longitudinal direction of the main scanning direction guide face 20; the positioning part of the guide rod 48 may be a simple plane or may be a recess part shaped like a letter L. An elastic body such as a spring or a fastener such as a screw may be used as the fix unit for pressing the guide rod against the positioning part. The direction in which the guide rod is pressed against the positioning part is not limited to the perpendicular direction of the table face 38 of the document table 36; for example, the guide rod may be pressed in the longitudinal direction of the main scanning direction guide face 20. An image sensor of lens reduction type may be used as the image pickup section. The invention may be applied to an image scanner of mirror move type wherein only a part of a mirror forming a part of the optical system is mounted on the carriage 32 and the image sensor is fixed to the upper housing or the lower housing. The invention can be applied not only to image scanners, but also to other image reading apparatuses of a copier, a facsimile, etc.

What is claimed is:

1. An image reading apparatus comprising:
  a transparent document table for placing a document thereon;
  a guide rod;
  a first housing member that includes a document guide part for abutting the document placed on the document table and positioning one side of the document on a table face of the document table, and a first positioning part and a second positioning part that project to the guide rod, wherein
  when opposite end parts of the guide rod abut against the first positioning part and the second positioning part, the first positioning part and the second positioning part positions the guide rod at a position where the one side of the document positioned by the document guide part and a longitudinal direction axis thereof are parallel, and
  the document guide part, the first positioning part and the second positioning part are formed in one piece;
  a fix unit that presses the guide rod against the first positioning part and the second positioning part;
  an image pickup section that generates image data representing an optical image on a light reception face;
  a carriage that is fitted slidably to the guide rod;
  an optical system that forms an image of the document placed on the document table on a main scanning line parallel with a perpendicular of the longitudinal direction axis of the guide rod on the light reception face of the image pickup section, at least a part of the optical system being mounted on the carriage; and
  a carriage drive section that moves the carriage along the guide rod.

2. The image reading apparatus according to claim 1, wherein the fix unit is formed integrally with a second housing member where the carriage drive section is fixed.

3. The image reading apparatus according to claim 1, wherein the first positioning part and the second positioning part have a recess part shaped like a letter U formed in the first housing member, the recess part into which the guide rod is fitted.

* * * * *